United States Patent
Wells

(10) Patent No.: US 11,054,848 B2
(45) Date of Patent: Jul. 6, 2021

(54) COMFORT CONTROLLER WITH USER FEEDBACK

(71) Applicant: Ademco Inc., Golden Valley, MN (US)

(72) Inventor: Leisha Wells, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 23 days.

(21) Appl. No.: 15/972,963

(22) Filed: May 7, 2018

(65) Prior Publication Data
US 2018/0253114 A1 Sep. 6, 2018

Related U.S. Application Data

(63) Continuation of application No. 13/905,312, filed on May 30, 2013, now Pat. No. 9,996,091.

(51) Int. Cl.
*G05B 15/02* (2006.01)
*G05D 23/19* (2006.01)

(52) U.S. Cl.
CPC ......... *G05D 23/1902* (2013.01); *G05B 15/02* (2013.01); *G05B 2219/2614* (2013.01)

(58) Field of Classification Search
CPC .............. G05D 23/1902; G05B 15/02; G05B 2219/2614; F24F 2011/0057; F24F 11/00; F24F 11/001; F24F 11/006
See application file for complete search history.

(56) References Cited

U.S. PATENT DOCUMENTS

| | | |
|---|---|---|
| 4,271,898 A | 6/1981 | Freeman |
| 4,341,345 A | 7/1982 | Hammer et al. |
| 4,442,972 A | 4/1984 | Sahay et al. |
| 4,487,028 A | 12/1984 | Foye et al. |
| 4,567,939 A | 2/1986 | Dumbeck et al. |
| 4,655,279 A | 4/1987 | Harmon et al. |
| 4,702,413 A | 10/1987 | Beckey et al. |
| 4,889,280 A | 12/1989 | Grald et al. |
| 4,926,839 A * | 5/1990 | Sugawara ............... F23N 1/102 126/116 A |
| 4,940,079 A | 7/1990 | Best et al. |

(Continued)

FOREIGN PATENT DOCUMENTS

| | | |
|---|---|---|
| CA | 2121247 C | 9/1997 |
| CA | 2289237 A1 | 7/2000 |

(Continued)

OTHER PUBLICATIONS

Prosecution History from U.S. Appl. No. 13/905,312, dated Aug. 3, 2015 through Feb. 26, 2018, 262 pp.

(Continued)

*Primary Examiner* — Jason Lin
(74) *Attorney, Agent, or Firm* — Shumaker & Sieffert, P.A.

(57) ABSTRACT

An HVAC control system is provided that is configured to prompt a user to indicate whether or not they are comfortable under current environmental conditions. In some instances the HVAC control system may be configured to prompt the user to provide additional information regarding other factors that may affect their comfort. The HVAC control system may use the information collected from the user to control an HVAC system to achieve and/or maintain an environmental condition within a building at a level at which the user is expected to be comfortable.

16 Claims, 11 Drawing Sheets

(56) References Cited

U.S. PATENT DOCUMENTS

| | | | |
|---|---|---|---|
| 5,078,316 A * | 1/1992 | Hara | B60H 1/00964 236/49.3 |
| 5,086,385 A * | 2/1992 | Launey | G06F 3/04847 340/6.11 |
| 5,105,366 A | 4/1992 | Beckey et al. | |
| 5,170,935 A * | 12/1992 | Federspiel | G05D 23/1902 236/44 C |
| 5,192,020 A | 3/1993 | Shah et al. | |
| 5,197,666 A | 3/1993 | Wedekind et al. | |
| 5,259,445 A | 11/1993 | Pratt et al. | |
| 5,303,561 A | 4/1994 | Bahel et al. | |
| 5,395,042 A | 3/1995 | Riley et al. | |
| 5,678,758 A | 10/1997 | Takegawa et al. | |
| 5,732,879 A | 3/1998 | Low | |
| 5,737,934 A | 4/1998 | Shah et al. | |
| 5,762,265 A * | 6/1998 | Kitamura | G05D 23/1917 236/51 |
| 5,822,997 A | 10/1998 | Atterbury et al. | |
| 5,934,084 A * | 8/1999 | Lee | F24F 3/14 62/93 |
| 6,145,751 A * | 11/2000 | Ahmed | G05D 23/1919 236/51 |
| 6,216,956 B1 * | 4/2001 | Ehlers | G05D 23/1923 236/47 |
| 6,220,039 B1 * | 4/2001 | Kensok | F24F 11/0008 62/93 |
| 6,298,285 B1 | 10/2001 | Addink et al. | |
| 6,478,084 B1 | 11/2002 | Kumar et al. | |
| 6,480,803 B1 | 11/2002 | Pierret et al. | |
| 6,536,675 B1 | 3/2003 | Pesko et al. | |
| 6,557,771 B2 | 5/2003 | Shah | |
| 6,622,926 B1 | 9/2003 | Sartain et al. | |
| 6,843,068 B1 | 1/2005 | Wacker | |
| 6,892,547 B2 | 5/2005 | Strand | |
| 6,893,068 B1 | 5/2005 | Varner | |
| 6,968,295 B1 | 11/2005 | Carr | |
| 6,976,366 B2 | 12/2005 | Starling et al. | |
| 6,986,468 B2 | 1/2006 | Low | |
| 7,089,087 B2 * | 8/2006 | Dudley | F24F 11/30 700/276 |
| 7,302,313 B2 * | 11/2007 | Sharp | G01N 1/26 700/275 |
| 7,346,467 B2 | 3/2008 | Bohrer et al. | |
| 7,389,159 B2 | 6/2008 | Warren et al. | |
| 7,424,868 B2 | 9/2008 | Reckels et al. | |
| 7,454,269 B1 | 11/2008 | Dushane et al. | |
| 7,644,869 B2 | 1/2010 | Hoglund et al. | |
| 7,784,702 B2 | 8/2010 | Michels | |
| 7,784,705 B2 | 8/2010 | Kasper et al. | |
| 7,839,275 B2 | 11/2010 | Spalink et al. | |
| 7,854,389 B2 | 12/2010 | Ahmed | |
| 7,886,166 B2 | 2/2011 | Shnekendorf et al. | |
| 7,886,985 B2 | 2/2011 | Moore et al. | |
| 7,904,209 B2 | 3/2011 | Podgorny et al. | |
| 7,933,689 B2 | 4/2011 | Warren et al. | |
| 7,953,518 B2 | 5/2011 | Kansal et al. | |
| 8,063,775 B2 | 11/2011 | Reed et al. | |
| 8,078,325 B2 | 12/2011 | Poth | |
| 8,141,791 B2 | 3/2012 | Rosen | |
| 8,185,245 B2 | 5/2012 | Amundson et al. | |
| 8,219,252 B2 | 7/2012 | Nanami | |
| 8,256,689 B2 | 9/2012 | Matsubara | |
| 8,280,556 B2 | 10/2012 | Besore et al. | |
| 8,356,760 B2 | 1/2013 | Riley, Jr. | |
| 8,374,725 B1 | 2/2013 | Ols | |
| 8,615,327 B2 * | 12/2013 | Takagi | F24F 11/0015 62/129 |
| 9,996,091 B2 | 6/2018 | Wells | |
| 2003/0217143 A1 * | 11/2003 | Dudley | F24F 11/30 709/224 |
| 2004/0117330 A1 * | 6/2004 | Ehlers | G06Q 10/10 705/412 |
| 2004/0118136 A1 * | 6/2004 | Patel | F25B 5/02 62/180 |
| 2004/0177629 A1 | 9/2004 | Eoga | |
| 2004/0243355 A1 * | 12/2004 | Kobayashi | G01D 4/006 702/188 |
| 2005/0061027 A1 * | 3/2005 | Hirakuni | F25B 13/00 62/527 |
| 2006/0004492 A1 * | 1/2006 | Terlson | F24F 11/30 700/276 |
| 2006/0010891 A1 | 1/2006 | Rayburn | |
| 2006/0038672 A1 | 2/2006 | Schoettle | |
| 2006/0100744 A1 * | 5/2006 | Sharma | F24F 11/0008 700/276 |
| 2006/0259219 A1 | 11/2006 | Wakiyama et al. | |
| 2007/0138307 A1 * | 6/2007 | Khoo | F24F 11/62 236/1 C |
| 2007/0257120 A1 | 11/2007 | Chapman et al. | |
| 2008/0015740 A1 | 1/2008 | Osann | |
| 2008/0217418 A1 | 9/2008 | Helt | |
| 2008/0218307 A1 | 9/2008 | Schoettle | |
| 2008/0281472 A1 * | 11/2008 | Podgorny | G05B 15/02 700/276 |
| 2009/0076658 A1 | 3/2009 | Kinnis | |
| 2009/0112369 A1 | 4/2009 | Gwerder et al. | |
| 2009/0171862 A1 | 7/2009 | Harrod et al. | |
| 2009/0204262 A1 * | 8/2009 | Nishimura | G05D 23/1919 700/276 |
| 2009/0302994 A1 * | 12/2009 | Rhee | H02J 13/0075 340/3.1 |
| 2009/0307573 A1 | 12/2009 | Lavelle et al. | |
| 2009/0308372 A1 | 12/2009 | Nordberg et al. | |
| 2010/0082309 A1 * | 4/2010 | Dawson | G06F 1/20 703/6 |
| 2010/0204834 A1 | 8/2010 | Comerford et al. | |
| 2010/0235004 A1 | 9/2010 | Thind | |
| 2010/0262298 A1 * | 10/2010 | Johnson | F24F 11/30 700/277 |
| 2010/0308119 A1 | 12/2010 | Steinberg et al. | |
| 2010/0318227 A1 | 12/2010 | Steinberg et al. | |
| 2011/0088455 A1 * | 4/2011 | Takagi | F24F 11/30 73/29.02 |
| 2011/0093123 A1 | 4/2011 | Alexanian | |
| 2011/0166710 A1 | 7/2011 | Kordik et al. | |
| 2011/0264286 A1 | 10/2011 | Park | |
| 2011/0276527 A1 | 11/2011 | Pitcher et al. | |
| 2012/0006525 A1 | 1/2012 | Lafleur et al. | |
| 2012/0016524 A1 | 1/2012 | Spicer et al. | |
| 2012/0031984 A1 | 2/2012 | Feldmeier et al. | |
| 2012/0095614 A1 | 4/2012 | DeLayo | |
| 2012/0158161 A1 | 6/2012 | Cohn et al. | |
| 2012/0165993 A1 | 6/2012 | Whitehouse | |
| 2012/0215366 A1 | 8/2012 | Redmond et al. | |
| 2012/0215759 A1 | 8/2012 | McCoy et al. | |
| 2012/0226388 A1 | 9/2012 | Evans et al. | |
| 2012/0232702 A1 | 9/2012 | Vass et al. | |
| 2012/0239203 A1 | 9/2012 | Amundson et al. | |
| 2012/0248212 A1 | 10/2012 | Storm et al. | |
| 2012/0253527 A1 | 10/2012 | Hietala et al. | |
| 2012/0259469 A1 * | 10/2012 | Ward | G05B 15/02 700/276 |
| 2012/0303165 A1 | 11/2012 | Qu et al. | |
| 2013/0087630 A1 | 4/2013 | Castillo et al. | |
| 2013/0099011 A1 | 4/2013 | Matsuoka et al. | |
| 2014/0207292 A1 * | 7/2014 | Ramagem | G05D 23/1902 700/278 |
| 2014/0214489 A1 * | 7/2014 | Bedi | G06Q 30/0203 705/7.32 |
| 2015/0330645 A1 * | 11/2015 | Speranzon | G06Q 10/04 700/276 |

FOREIGN PATENT DOCUMENTS

| | | |
|---|---|---|
| CA | 2289237 C | 11/2004 |
| CN | 101545667 A | 9/2009 |
| CN | 101825325 A | 9/2010 |
| CN | 101825327 A | 9/2010 |
| CN | 101865512 A | 10/2010 |
| CN | 102022801 A | 4/2011 |
| CN | 102375443 A | 3/2012 |

(56) References Cited

FOREIGN PATENT DOCUMENTS

| EP | 286888 | A1 | 10/1988 |
|---|---|---|---|
| EP | 1025474 | A1 | 11/2002 |
| EP | 1685351 | A1 | 8/2006 |
| EP | 2354681 | A1 | 8/2011 |
| JP | 04078709 | A | 3/1992 |
| JP | 05231693 | A | 9/1993 |
| JP | 05231696 | A | 9/1993 |
| JP | 06323595 | A | 11/1994 |
| JP | 10009647 | A | 1/1998 |
| JP | 2004003759 | A | 1/2004 |
| JP | 2006008411 | A1 | 1/2006 |
| JP | 2007172406 | A | 7/2007 |
| JP | 2008241151 | A | 10/2008 |
| JP | 2009076106 | A | 4/2009 |
| JP | 2009180459 | A | 8/2009 |
| JP | 2010065937 | A | 3/2010 |
| JP | 2010139129 | A | 6/2010 |
| JP | 2010151398 | A | 7/2010 |
| JP | 2011153735 | A | 8/2011 |
| JP | 5110383 | B2 | 12/2012 |
| WO | 2007126884 | A2 | 11/2007 |
| WO | 2011062942 | A1 | 5/2011 |
| WO | 2011121299 | A1 | 10/2011 |
| WO | 2012013964 | A1 | 2/2012 |
| WO | 2012072079 | A2 | 6/2012 |
| WO | 2012112494 | A1 | 8/2012 |

OTHER PUBLICATIONS

E Source Companies LLC., "HVAC: Building Automation Systems: Purchasing Advisor," 10pages, Downloaded Dec. 19, 2012.
Erickson L. et al., "Thermovote: Participatory Sensing for Efficient Building HVAC Conditioning," 8 pages, Doanloaded May 6, 2013.
Federspiel, Clifford C.; Asada, Harubiko, "User-Adaptable Comfort Control for HVAC Systems," American Control Conference, 1992, vol., No., pp. 2312,2319, Jun. 24-26, 1992.
Fountain, M. et al., "Comfort Control for Short-Term Occupancy," UC Berkeley Center for the Built Environment, 15 pages, Jan. 14, 1994.
Trane, "XT300C, XT302C, Deluxe Programmable Heat-Cool Thermostats: Owner's Guide," American Standard Inc., Pub. No. 22-5127-04, 68 pages, Downloaded Feb. 6, 2013. 69-1214.
Jazizadeh, Farrokh et al., "Toward Adaptive Comfort Management in Office Buildings Using Participatory Sensing for End User Driven Control," Buildsys, 8 pages, Nov. 6, 2012. ACM 978-1-4503-1170-0.
Mirinejad, Hossein, "A Review of Intelligent control Techniques in HVAC Systems," University of Louisville, Department of Electrical and Computer Engineering, 5 pages, Downloaded May 6, 2013.
U.S. Appl. No. 13/905,379, filed May 30, 2013.
Parks Associates, "Residential Energy Savings through Data Analytics," EcoFactor, 16 pages, Downloaded Jan. 24, 2013. http://www/fsec.ucf.edu/en/publications/html/FSEC-PF-328-97/.
Peffer, Therese, et al., "How people use thermostats in homes: A review," Elsevier Ltd., ScienceDirect: Building and Environment 46, p. 2529-2541, Jun. 3, 2011. www.elsevier.com/locate/buildenv.
Riley, Roger, "HVAC Control Modeling," 45 pages, Mar. 10, 2008.
Schumannm Anika et al., "Learning User Preferences to Maximise Occupant Comfort in Office Buildings," Cork Contraint Computation Centre, University College Cork, Ireland, 10 pages, Downloaded May 6, 2013.
Manna et al., "Learning Individual thermal Comfort Using Robust Locally Weighted Regression with Adaptive Bandwidth," Workshop on AI Problems and Approaches for Intelligent Environments, p. 35-39, Downloaded May 6, 2013.

* cited by examiner

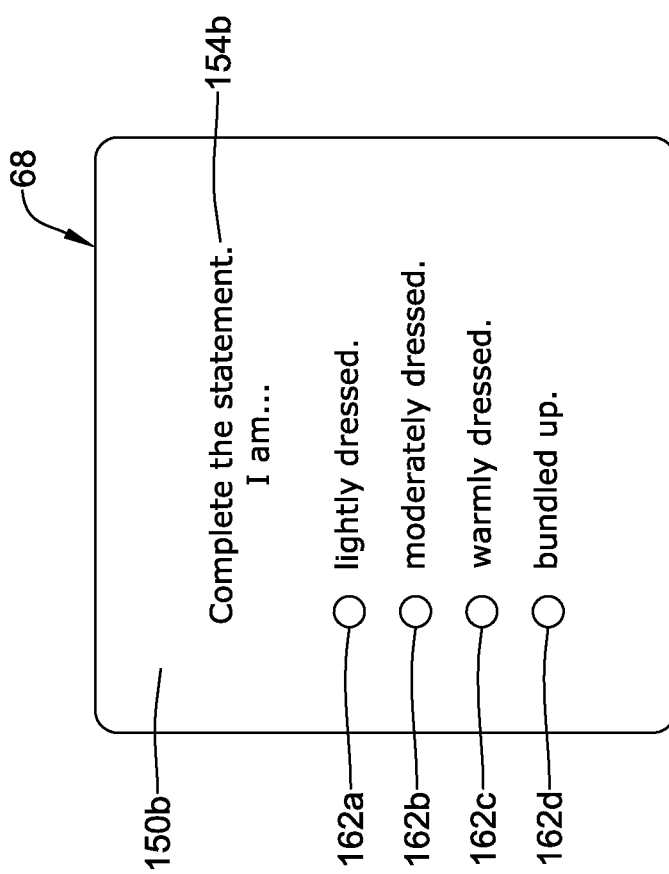

COMFORT CONTROLLER WITH USER FEEDBACK

The is a continuation of co-pending U.S. patent application Ser. No. 13/905,312, filed May 30, 2013 and entitled "COMFORT CONTROLLER WITH USER FEEDBACK", which is incorporated herein by reference.

TECHNICAL FIELD

The present disclosure relates generally to heating, ventilation, and/or air conditioning (HVAC) controllers.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Typically, a user enters one or more set points into the HVAC controller, and the HVAC controller controls the HVAC system to meet the one or more set points. If the user subsequently perceives the space to be uncomfortable, the user typically changes the set point to a new set point that the user believes will produce a comfortable environment. Because the user is estimating what set point will produce a comfortable environment, multiple iterations are often required before the user finds a comfortable set point. Also, the perceived comfortable set point may change over time, such as when an outdoor temperature drops significantly. This may require the user tore-estimate what set point will produce a comfortable environment under the new outdoor conditions. This can be an annoying and reoccurring process for the user, and can result in non-optimum energy usage. Moreover, different users may experience a different level of perceived comfort under the same conditions, which is largely ignored by many present systems.

SUMMARY

The present disclosure relates generally to HVAC controllers, and more particularly, to HVAC controllers that control one or more environmental conditions within a building based, at least in part, on a user's perceived comfort. In some instances, an HVAC controller may receive feedback from one or more users regarding their perceived comfort level under various conditions. Using this feedback, the HVAC controller may learn the conditions that user perceives as comfortable, and then may monitor the current conditions, and based on the current conditions, drive the environmental conditions inside of the building toward those that the user(s) will perceive as being comfortable. As will be described more fully herein, receiving feedback from one or more users regarding their perceived comfort under various conditions may help the HVAC controller provide increased comfort, and in some cases, reduced energy usage.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
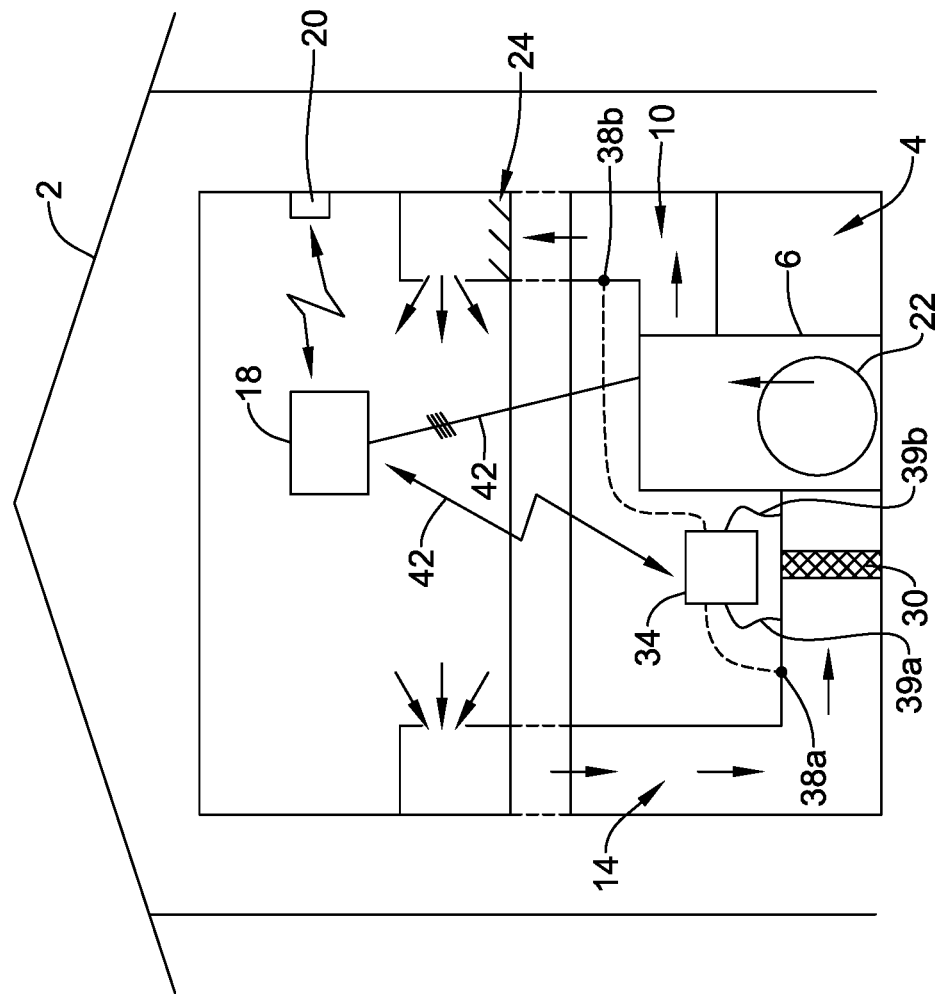
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. The HVAC system 4 may include an internet gateway or other device 20 that may allow one or more of the HVAC components, as described herein, to communicate over a wide area network (WAN) such as, for example, the Internet. In some cases, the gateway device 20 may be integrated into the HVAC controller 18, but this is not required.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
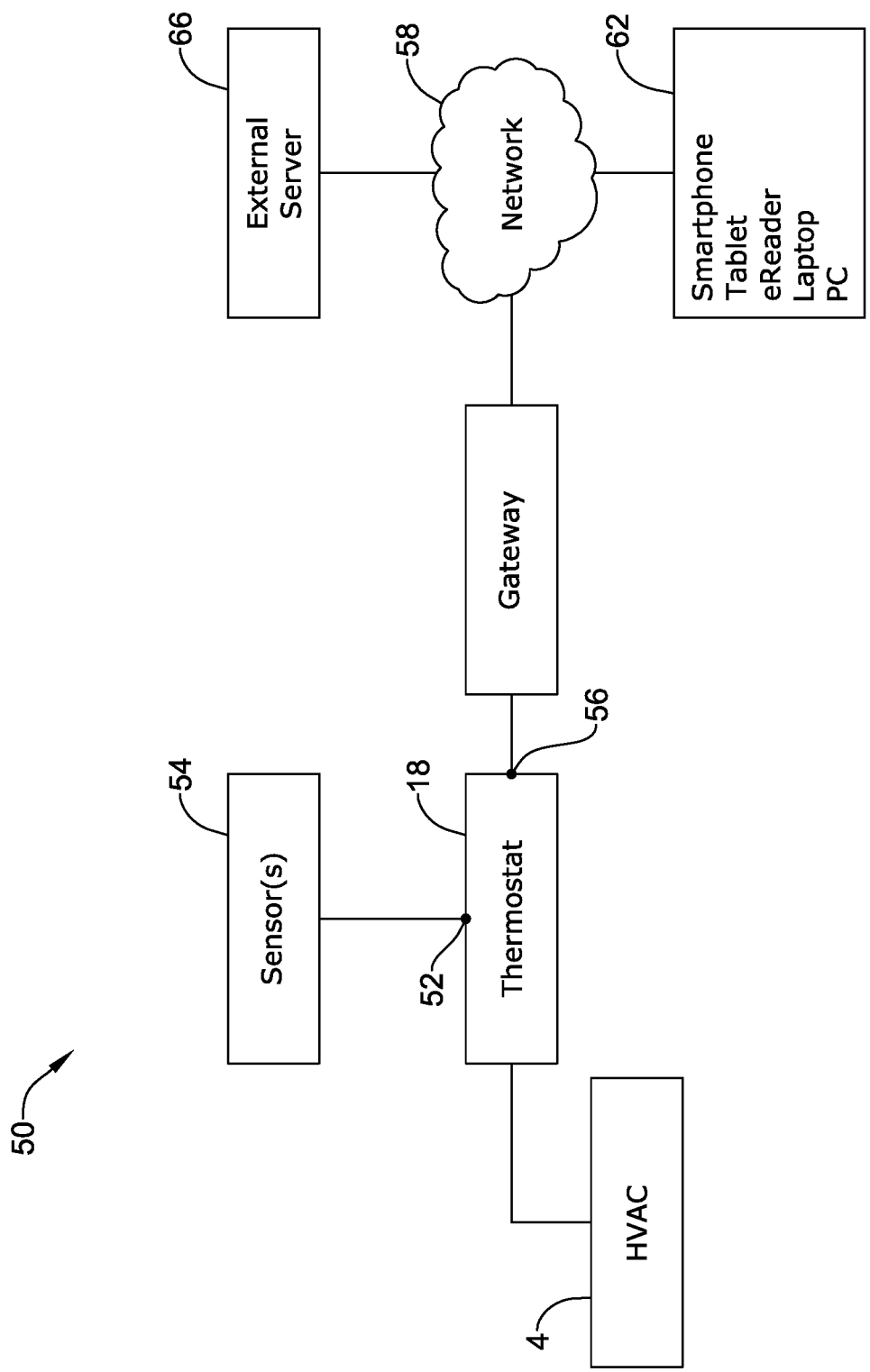
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more components 6 of the HVAC system 4. As discussed above, the HVAC controller 18 may communicate with the one or more components 6 of the HVAC system 4 via a wired or wireless link. As shown in FIG. 2, the HVAC controller 18 may include an input port 52 for communicating with one or more internal and/or remote sensors 54 such as, for example, an internal temperature sensor, an internal humidity sensor, a remote indoor temperature sensor, a remote indoor humidity sensor, a remote outdoor temperature sensor and/or a remote outdoor humidity sensor. In some cases, the input port 52 may be a wireless input port adapted to receive a wireless signal from one of the aforementioned sensors over a wireless network such as, for example, a wireless local area network (LAN). In addition, the input port 52 may be coupled to one or more internal sensors such as an internal temperature sensor and/or an indoor humidity sensor. Additionally, the HVAC controller 18 may include a network port 56 that facilitates communication over one or more wired or wireless networks 58, and that may accommodate remote access and/or control of the HVAC controller 18 via another device 62 such as a cell phone, tablet, e-reader, laptop computer, personal computer, key fob, or the like.

Depending upon the application and/or where the HVAC user is located, remote access and/or control of the HVAC controller 18 may be provided over the network 58. The network may be a wireless local area network (LAN) or a wide area network (WAN) such as, for example, the Internet. A variety of mobile wireless devices 62 may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, wireless network-enabled key fobs, e-readers and the like.

In many cases, the mobile wireless devices 62 are configured to communicate wirelessly over the network 58 with the HVAC controller 18 via one or more wireless communication protocols including, but not limited to, cellular communication, ZigBee, Z-Wave, REDLINK™ Bluetooth, WiFi, IrDA, dedicated short range communication (DSRC), EnOcean, and/or any other suitable common or proprietary wireless protocol, as desired.

In some cases, the HVAC controller 18 may be programmed to communicate over the network 58 with an external web service hosted by one or more external web servers 66. A non-limiting example of such an external web service is Honeywell's TOTAL CONNECT™ Web service. The HVAC controller 18 may be configured to upload selected data via the network 58 to the external web service where it may be collected and stored on the external web server 66. In some cases, the data may be indicative of the performance of the HVAC system 4. In other cases, the data may be indicative of a user's perceived comfort level associated with one or more environmental conditions and may be used to build a comfort profile for an individual user which may be stored on the web server 66, in a device such as, for example, an HVAC controller 18 or portable remote device 62, and/or any combination of these. Additionally, the HVAC controller 18 may be configured to receive and/or download selected data, settings and/or services including software updates from the external web service over the second network 58.

The data, settings and/or services may be received automatically from the web service, downloaded periodically in accordance with a control algorithm, and/or downloaded in response to a user request. For example, the HVAC controller 18 may be configured to receive and/or download an HVAC operating schedule and operating parameter settings such as, for example, temperature set points, humidity set points, start times, end times, schedules, window frost protection settings, and/or the like. In some cases, the operating schedule and/or operating parameters downloaded by the HVAC controller 18 may be associated with a user's comfort profile. In some cases, the user's comfort profile may be transferred from a portable device such as, for example, any one of the portable devices 62 described herein via Near Field Communication, RFID and/or a file transfer protocol. In other cases, the user's comfort profile may be accessible via a web server 66. Additionally, the HVAC controller 18 may be configured to receive local weather data including the current outdoor temperature and/or outdoor humidity, weather alerts and/or warnings, pollen forecast and/or pollen count, smog alert, solar index (e.g. UV index) and/or the like. The weather data may be provided by a different external server such as, for example, a web server maintained by the National Weather Service. These are just some examples.

Figure 3:
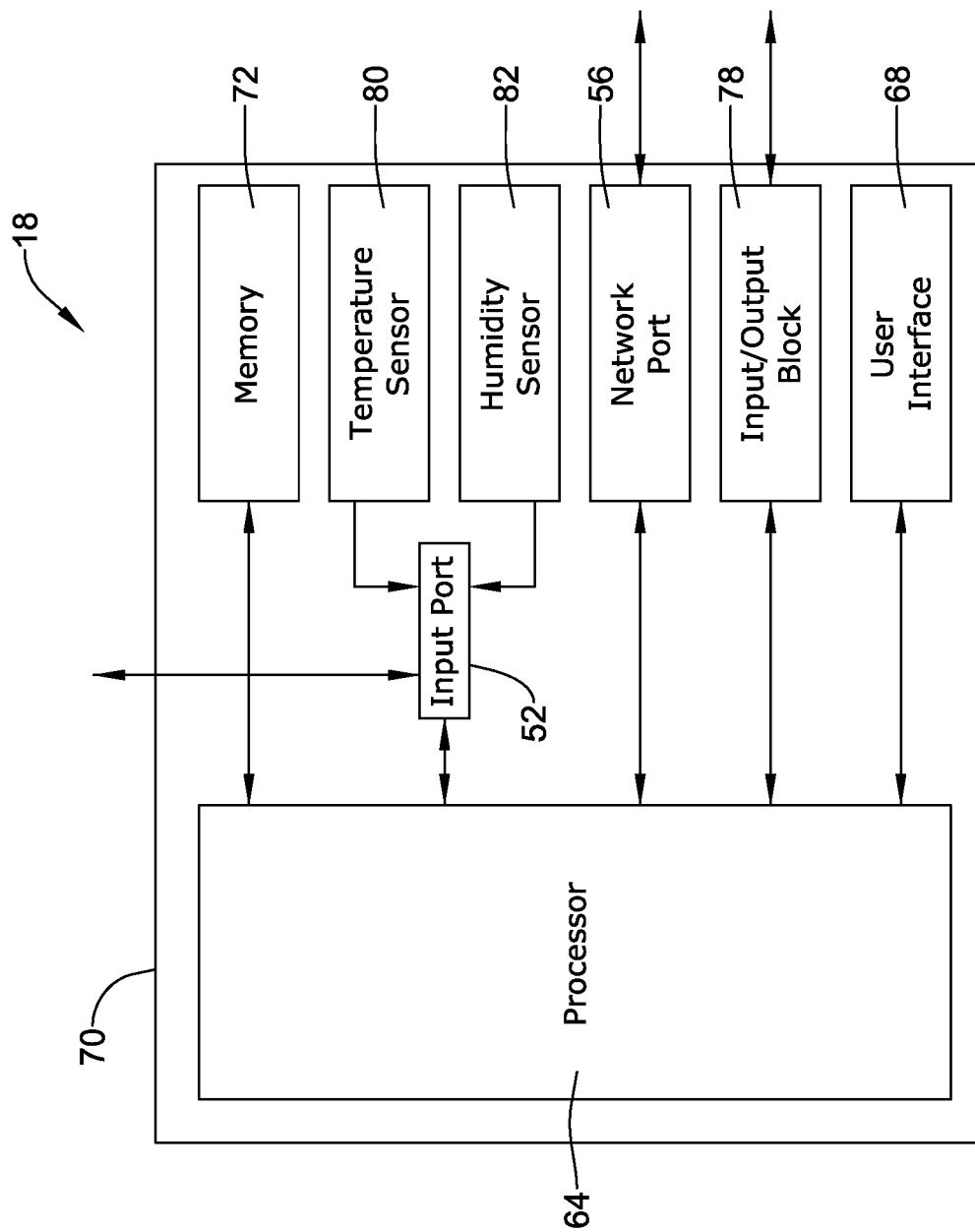
FIG. 3 is a schematic block diagram of an illustrative HVAC controller.

FIG. 3 is a schematic view of an illustrative HVAC controller 18 of a thermal comfort control system. In some instances, the HVAC controller 18 may be a thermostat, but this is not required. Additionally, in some cases, the HVAC controller 18 may be accessed and/or controlled from a remote location over a computer network 58 (FIG. 2) using a mobile wireless device 62 such as, for example, a smart phone, a PDA, a tablet computer, a laptop or personal computer, a wireless network-enabled key fob, an e-reader, and/or the like. As shown in FIGS. 2 and 3, the HVAC controller 18 may include an input port 52 for communicating with one or more internal and/or remotely located sensor 54. In some cases, the input port 52 may be in communication with one or more internal sensors. In addition, the input port 52 may be adapted to receive a signal indicative of a measure related to an environmental condition inside or outside of the building. In some cases, the input port 52 may receive the measure related to an environmental condition inside or outside of the building over a wireless network such as, for example, a wireless LAN, but this is not required. The network port 56 may be a wireless communications port including a wireless transceiver for sending and/or receiving signals over a wireless network 58 such as for example a wireless local area network (LAN) or a wide area network (WAN) such as, for example, the Internet. In some cases, the network port 56 may be in communication with a wired or wireless router or gateway for connecting to the network 58, but this is not required. In some cases, the router or gateway may be integral to the HVAC controller 18 or may be provided as a separate device.

Additionally, the illustrative HVAC controller 18 may include a processor (e.g. microprocessor, microcontroller, etc.) 64 and a memory 72. The processor 64 may be in communication the input port 52 and/or the network port 56 and with the memory 72. The processor 64 and the memory 72 may be situated within a housing 70 that may include at least one bracket for mounting the HVAC controller 18 to a wall located within the building or structure. In addition, the HVAC controller 18 may also include a user interface 68 including a display, but this is not required. In some instances, the user interface 68 may be secured relative to the housing 70. In other instances, the user interface 68 may be located at a remote device such as any one of the remote devices disclosed herein.

In some cases, the HVAC controller 18 may include a timer (not shown). The timer may be integral to the processor 64 or may be provided as a separate component. The HVAC controller 18 may also optionally include one or more control terminals 78 for receiving one or more signals from the HVAC system 4 and/or for providing one or more control signals to the HVAC system 4. For example, the control terminals 78 may communicate with one or more HVAC components 6 of the HVAC system 4. Alternatively, or in addition to, the control terminals 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may include an internal temperature sensor 80 located within the housing 70, but this is not required. The HVAC controller may also include an internal humidity sensor 82 located within the housing 70, but this is also not required. When provided, the temperature sensor 80 and/or the humidity sensor 82 may be coupled to the input port 52 which, in turn, is coupled to the processor 64. In some cases, the HVAC controller 18 may communicate with one or more remote temperature sensors, humidity sensors, and/or occupancy sensors located throughout the building or structure via the input port 52 and/or network port 56. Additionally, in some cases, the HVAC controller may communicate with a temperature sensor and/or humidity sensor located outside of the building or structure for sensing an outdoor temperature and/or humidity if desired. As such, the HVAC controller 18 may receive at least one of a measure related to an indoor temperature inside the building or structure, a measure related to an indoor humidity inside the building or structure, and a measure related to an outdoor temperature and/or outdoor humidity outside of the building or structure. In some cases, the HVAC controller 18 may receive weather data via the network port 56. The weather data may include a current outdoor temperature and/or outdoor humidity, pollen forecast and/or pollen count, solar index (e.g. UV index), a smog alert, awing speed, a wind direction and/or the like. These are just some examples.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set points, humidity set points, an operating schedule, start and end times, window frost protection settings, operating modes, and/or the like. In some cases, the processor 64 may operate in accordance with a control algorithm that is configured to determine and control to a feels-like temperature as shown and described in U.S. patent application Ser. No. 13/905,379, entitled "PERCEIVED COMFORT TEMPERATURE CONTROL", which is incorporated herein by reference in its entirety for all purposes. At least a portion of the control algorithm may be stored locally in the memory 72 of the HVAC controller 18. The control algorithm (or portion thereof) may be stored locally in the memory 72 of the HVAC controller 18 and may, in some instances, be periodically updated in accordance with a predetermined schedule (e.g. once every 24 hours, 48 hours, 72 hours, weekly, monthly, etc.), updated in response to any changes to the control algorithm made by a user, updated in response to a user's request and/or updated in accordance with a user's comfort profile. A user's comfort profile may be specific to a user, and may include conditions under which the user is expected to be comfortable. In some cases, at least a portion of the control algorithm and/or any updates to the control algorithm may be received from an external web service over the second network.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings (e.g. temperature set points, humidity set points, start and end times, etc.) associated with each of the operating modes may be established through a user interface 68 provided locally at the HVAC controller 18 or provided at a remote device, and/or through an external web service and delivered to the HVAC controller via the network 58 where they may be stored in the memory 72 for reference by the processor 64. In some cases, the operating modes and the operating parameter settings associated with each of the operating modes may be established based on a user's comfort profile.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, responses to interview questions, comfort level rating(s) and/or the like. Additionally, the user interface 68 may permit to change a temperature set point, a humidity set point, a starting time, an ending time, a schedule time, a diagnostic limit, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface. Independent of the type of display, in some cases, the processor 64 may be programmed to display one or more interview screens via the display of the user interface 68 that prompt a user to provide an input that indicates whether or not the user is comfortable under a selected environmental condition.

In some instances, the user interface 68 need not be physically accessible to a user at the HVAC controller 18. Instead, the user interface may be a virtual user interface 68 provided by an application program or "app" executed by a mobile wireless device such as, for example, a smartphone or tablet computer. Such a program may be available for download from an external web service such as, for example, Apple's iTunes, Google's Google Play, and/or Amazon's Kindle Store. Through the application program executed by the mobile wireless device, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, responses to interview questions, comfort level rating(s) and/or the like.

In other cases, the user interface 68 may be a virtual user interface 68 that is accessible via the first network 54 and/or second network 58 using a mobile wireless device such as one of those devices 62 previously described herein. In some cases, the virtual user interface 68 may include one or more web pages that are broadcasted over a network 58 (e.g. LAN or WAN) by an internal web server implemented by the processor 64. When so provided, the virtual user interface 68 may be accessed over the network 58 using a mobile wireless device 62 such as any one of those listed above. Through the one or more web pages, the processor 64 may be configured to display information relevant to the current operating status of the HVAC system 4 including the current operating mode, temperature set point, actual temperature within the building, a feels-like temperature, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, responses to interview questions, comfort level rating(s) and/or the like.

In still other cases, the virtual user interface 68 may include one or more web pages that are broadcasted over the network 58 (e.g. WAN or the Internet) by an external web server (e.g. web server 66). The one or more web pages forming the virtual user interface 68 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the network 58 to the HVAC controller 18 where it is received via the network port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

A user's comfort level within a building or structure can be affected by multiple factors. These factors include, but are not limited to, the HVAC system operating mode (e.g. heat or cool), indoor and/or outdoor humidity, indoor temperature, outdoor temperature, seasonal changes, radiant wall temperature of the interior exterior walls of the building or structure, the solar index, smog alert level, pollen count, the user's gender, the user's attire, the user's age, the user's activity level, and/or the building occupancy level, just to name a few. In one example, as the indoor humidity increases, the perceived temperature also increases even though the interior dry bulb temperature remains the same. In another example, as the outdoor temperature decreases, the temperature of the exterior walls (radiant wall temperature) within the building decreases, which can cause the perceived temperature inside of the building to decrease even though the interior dry bulb temperature remains the same. The outdoor temperature is believed to have a greater effect on the perceived indoor temperature felt by the user than the indoor humidity. Also, different individuals can perceive a different comfort level under the same set of conditions.

The present disclosure contemplates verifying a user's comfort level associated with one or more environmental conditions. A user's comfort level can be affected bay variety of factors including, for example, outdoor environmental conditions, indoor environmental conditions, the user's activity level, the user's choice of seasonally appropriate attire, time of day, location, and/or other factors. Verifying a user's comfort level associated with one or more current environmental conditions may facilitate a greater degree of personalized comfort control. Because the environmental conditions inside of the building can be tailored to the user's personal comfort level, the HVAC system can be controlled in a manner that does not waste energy conditioning air beyond that required to achieve comfort, which in some cases, can save energy over time.

In some cases, the processor 64 may be configured to identify and/or determine one or more environmental conditions of the building which may affect a user's perceived comfort level and, in response, prompt the user to provide an input that is indicative of their current comfort level associated with the one or more environmental conditions. In some instances, the processor 64 may be configured to detect a change in one or more environmental conditions of the building identified by the processor 64 that may affect a user's perceived comfort level and, in response, prompt the user to provide an input that is indicative of his/her comfort level associated with one or more environmental conditions in response to the detected change.

The environmental conditions that may be identified and/or determined by the processor 64 may include, but are not limited to, an indoor temperature, an outdoor temperature, an indoor humidity level, an outdoor humidity level, a solar index (e.g. UV rating), smog alert level, a wind speed, a wind direction, a pollen count, a pollen forecast, and/or the like. In some cases, as discussed herein, the HVAC controller 18 may communicate with one or more remote temperature sensors, humidity sensors, and/or occupancy sensors located throughout the building or structure via the input port 52 and/or network port 56. Alternatively, or in addition, the HVAC controller 18 may, in some instances, communicate with a temperature sensor and/or humidity sensor located outside of the building or structure for sensing an outdoor temperature and/or humidity if desired. In some instances, the processor 64 may receive at least one of a measure related to an indoor temperature inside the building or structure, a measure related to an indoor humidity inside the building or structure, a measure related to an outdoor temperature and/or outdoor humidity outside of the building or structure. In some cases, the HVAC controller 18 may receive weather data via the network port 56 that may include a current outdoor temperature and/or outdoor humidity, a wind speed and/or a wind direction, smog alert level, a pollen forecast and/or pollen count, and a solar index. These are just some examples.

In some cases, the processor 64 may be programmed to prompt a user to provide an input that is indicative of his/her current comfort level during each of two or more conditions identified by the processor 64. In one example, the processor 64 may prompt the user to provide an input indicative of the current comfort level associated with two or more combinations of an indoor temperature, an indoor humidity and an outdoor temperature. In cases where there may be multiple users associated with the HVAC system 4, the processor 64 may be programmed to prompt each user to provide an input that is indicative of their comfort level for each condition identified by the processor 64.

Upon receiving an input from a user that is indicative of the user's current comfort level for one or more conditions or change in conditions identified by the processor 64, the processor 64 may be programmed to store the user's indicated comfort level and associate that comfort level with the of the one or more conditions identified by the processor in the memory 72. Additionally, the processor 64 may also identify the time of day and/or location of the user if a location based service (e.g. GPS) is available, and, in some cases, append the user's indicated comfort level associated with the one or more conditions with this information. In some cases, the user's indicated comfort level associated with the one or more conditions identified by the processor 64 may be stored in a database in the memory 72, and may be used to develop or build a comfort profile for the user. A user's comfort profile may be specific to the individual user, and may include conditions under which the user is expected to be comfortable based on the user's input. In other cases, where the HVAC controller 18 may be in communication with an external server such as external server 66, the data may be stored in a remote database located at the external server 66 and may be accessible via the network 58. The data may be associated with a user's comfort profile, as discussed above. Depending upon the application, a user's comfort profile may be stored in the memory 72 or at an external server 66 for each individual user of the HVAC system 4. The user's comfort profile may be accessed via a user's portable remote device such as, for example, a smart phone or a tablet computer, but not limited to these. Alternatively, or in addition to, the user's comfort profile may be stored in the local memory of a user's portable remote device. Storing the user's comfort profile at an external server 66 or within the local memory of a user's portable device 62 may increase the portability of the user's profile making it accessible to the user in other environments such as, for example, at a hotel, office or second residence, and not limit its use to a single building or structure.

In some cases, in response to an input from a user that is indicative of the user's current comfort level under one or more conditions or change in conditions identified by the processor 64, the processor 64 may be configured to prompt the user to enter information regarding one or more user-related conditions. For example, the processor 64 may be programmed to display one or screens via the display of the user interface 68 that are configured to prompt a user to enter other data, such as data regarding his/her activity level and/or attire. The processor 64 may collect the data regarding the user's activity level and/or the user's attire provided by the user via the user interface 68, and may associate this data with the identified condition or change in condition, as well as the user's comfort level indicated for the identified condition or change in condition. This data may be collected and stored in a database contained in the memory 72 of the HVAC controller 18 or at an external server 66, as described herein, and in some cases used to build or develop a user's comfort profile.

In some cases, the processor 64 may be programmed to repeat the process of identifying an environmental condition or change in environmental condition, collecting data from the user regarding their comfort level and/or what user-related conditions may affect their comfort level under the identified environmental condition(s), and storing the collected data in a database one or more times. This data may be used to build or develop a user's comfort profile which may identify one or more conditions under which the user is expected to be comfortable. The more data collected from a user under a variety of conditions, the more comprehensive a user's comfort profile may be.

The processor 64 may be further programmed to identify one or more conditions or range of conditions under which the user is expected to be comfortable, based at least in part on the information collected from the user via the user interface 68 and/or in accordance with a user's comfort profile. These identified conditions or range of conditions may change over the time of day, over multiple days, over the indoor and/or outdoor conditions, and/or over a variety of locations. For a given identified condition, the processor 64 may learn the indoor conditions that will make the user "comfortable" based on the user's feedback. In some cases, the processor 64 may send control signals to the HVAC system 4 to drive the indoor conditions towards those that will make the user "comfortable". For example, the processor 64 may automatically change a temperature and/or humidity set point for the inside space to make the user "comfortable" given the current identified conditions. The current identified conditions may include indoor and/or outdoor conditions.

In other cases, the processor 64 may make recommendations to the user via the user interface 68 based on at least in part on the information collected from the user via the user interface 68 and/or in accordance with a user's comfort profile. For example, the processor may prompt the user to change an operating parameter set point, open or close one or more windows, and/or change their attire via the user interface 68 such that if the user chooses to follow the recommendation issued by the processor 64, the user may be able to achieve and/or maintain a desired comfort level under the current identified conditions. The current identified conditions may include indoor and/or outdoor conditions.

In cases where they may be multiple users, the processor 64 may be configured to compare each user's indicated comfort level associated with an identified condition and determine a common condition under which all or a majority of the users may perceive comfort. Additionally, the processor 64 may be configure to compare each user's indicated comfort level associated with an identified condition based on each individual users' comfort profiles. In some cases, the processor 64 may be configured to prioritize certain conditions over other conditions such that some degree of comfort is achieved for all users within the building. Additionally, the processor 64 may be configured to control the one or more HVAC components of the HVAC system 4 to maintain the one or more conditions or range of conditions at a level that maintains a user's or group of user's expected comfort level within the building. For example, in some cases, the processor 64 may be configured to transmit one or more control signals via the control terminals 78 to one or more HVAC components of the HVAC system 4 to drive the environmental conditions within the building toward one or more indoor conditions under which the user or group of users is expected to be comfortable based at least in part on the information collected from the user via the user interface 68.

In some embodiments, as described above, a portable device may provide a user interface for interacting with a HVAC controller that is in communication with an HVAC system. In other embodiments, a portable device may be configured to develop a user's comfort profile based on data collected from the user, as described herein, and may be further configured to make recommendations to the user based on the user's comfort profile. For example, a user's portable device may recommend that the user take a certain action such as increasing a temperature set point on an HVAC controller so as to maintain or achieve the user's preferred comfort level under certain conditions. The user's comfort profile may be stored locally in the memory of the portable device or stored on an external web server such as, for example, web server 66 that may be in communication with the portable device.

Figure 4:
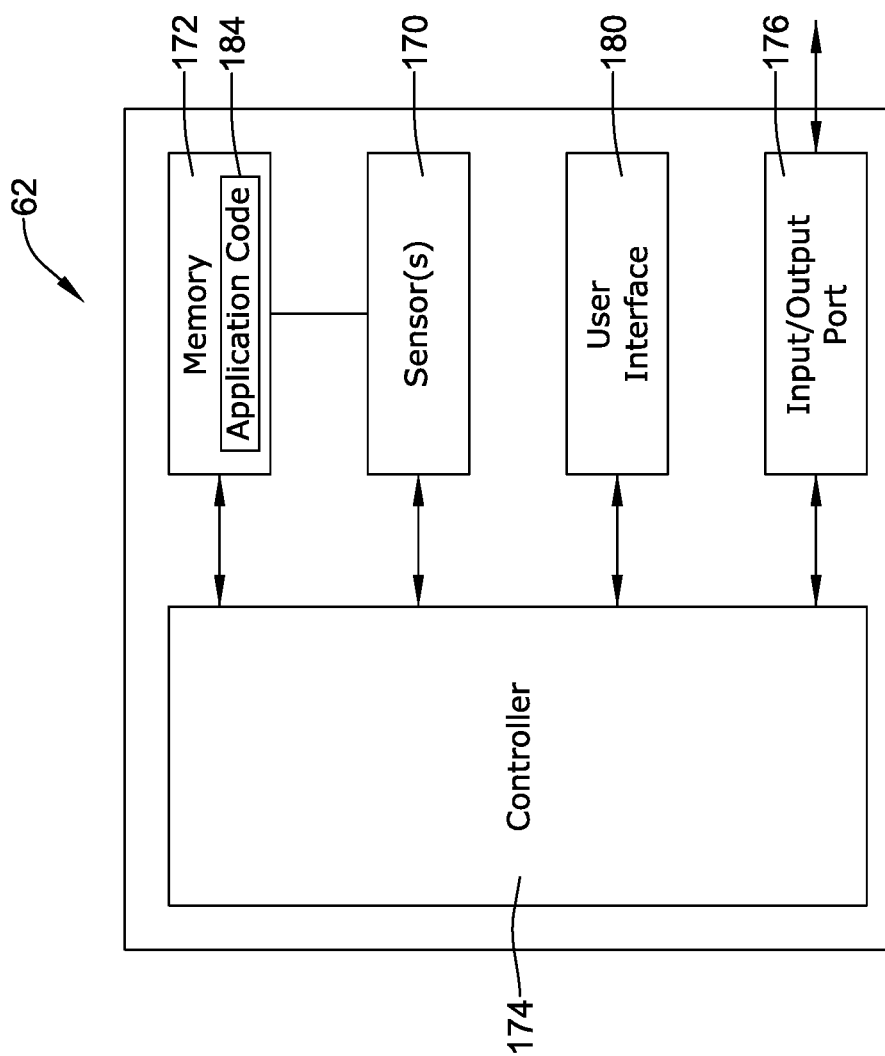
FIG. 4 is a schematic block diagram of an illustrative portable remote device.

FIG. 4 is a schematic view of an exemplary portable device 162 that may be programmed to execute an application programming code for collecting feedback from a user regarding the user's comfort under current environmental conditions of a space. As discussed herein, the portable device 62 may be a hand-held portable device, and may be any one of a smart phone, a tablet computer and/or any other suitable portable device. The portable device may include one or more sensors 170 for sensing a parameter indicative of an environmental condition such as, for example, temperature or humidity. Additionally, as shown in FIG. 4, the portable device 162 may include at least one input/output port 176 for communicating over one or more networks (e.g. a wireless local area network (wLAN), cellular network, and/or a wide area network (WAN) such as, for example, the Internet). The input/output port 176 may include at least one wireless transceiver for wirelessly sending and/or receiving signals over the one or more networks. Additionally, the illustrative portable device 162 may include a processor (e.g. microprocessor, microcontroller, etc.) 174 coupled to and in communication with the one or more sensors 170, the memory 172, an input/output port 176, and a user interface 180. In many cases, the user interface 180 may include a graphical user interface 180 including a touch screen liquid crystal display (LCD), but this is not required.

The memory 172 may be any suitable type of storage device including, but not limited to, RAM, ROM, EPROM, flash memory, a hard drive, user-removable memory, and/or the like. In some cases, the processor 174 may store information within the memory 172, and may subsequently retrieve the stored information from the memory 172. In other cases, the processor 174 may store information at a remote device and subsequently retrieve the stored information from the remote device.

The processor 174 may be configured to retrieve and execute application program code 84 stored in the memory 172 of the portable device 162. It will be generally recognized that multiple application codes for executing different functions may be stored in the memory 172 of the portable device 162. According to various embodiments, the memory 172 may include an application programming code 184 for collecting data from a user regarding a user's comfort under certain environmental addition and other user-related data, and for developing a user's comfort profile based, at least in part, on the data collected from the user. In many cases, the user's comfort profile may be stored locally in the memory 172 of the portable device 162. In other case, the user's comfort profile may be stored on a remote server such as, for example, web server 66.

In some cases, the processor 174 may be configured to identify and/or determine one or more environmental conditions of the building which may affect a user's perceived comfort level and, in response, prompt the user to provide an input that is indicative of their current comfort level associated with the one or more environmental conditions. The one or more environmental conditions may be identified using the one or more sensors 170 or, in some cases, may be identified based on data received via the input/output port 176. In some instances, the processor 174 may be configured to detect a change in one or more environmental conditions of the building identified by the processor 174 that may affect a user's perceived comfort level and, in response, prompt the user to provide an input that is indicative of his/her comfort level associated with one or more environmental conditions in response to the detected change. The environmental conditions that may be identified and/or determined by the processor 174 may include, but are not limited to, an indoor temperature, an outdoor temperature, an indoor humidity level, an outdoor humidity level, a solar index (e.g. UV rating), smog alert level, a wind speed, a wind direction, a pollen count, a pollen forecast, and/or the like.

In some cases, the processor 174 may be programmed to prompt a user to provide an input that is indicative of his/her current comfort level during at least one condition identified by the processor 174. In one example, the processor 174 may prompt the user to provide an input indicative of the current comfort level associated with at least one combination of an indoor temperature, an indoor humidity and an outdoor temperature. Upon receiving an input from a user that is indicative of the user's current comfort level for one or more conditions or change in conditions identified by the processor 174, the processor 174 may be programmed to store the user's indicated comfort level and associate that comfort level with the of the one or more conditions identified by the processor in the memory 172. Additionally, the processor 174 may also identify the time of day and/or location of the user if a location based service (e.g. GPS) is available, and, in some cases, append the user's indicated comfort level associated with the one or more conditions with this information. In some cases, the user's indicated comfort level associated with the one or more conditions identified by the processor 174 may be stored in a database in the memory 172, and may be used to develop or build a comfort profile for the user. A user's comfort profile may be specific to the individual user, and may include conditions under which the user is expected to be comfortable based on the user's input. The data may be associated with a user's comfort profile, as discussed above. Depending upon the application, a user's comfort profile may be stored in the memory 172 or at an external server 66. Storing the user's comfort profile at an external server 66 or within the local memory of a user's portable device may increase the portability of the user's profile making it accessible to the user in other environments such as, for example, at a hotel, office or second residence, and not limit its use to a single building or structure or a particular HVAC system.

In some cases, in response to an input from a user that is indicative of the user's current comfort level under one or more conditions or change in conditions identified by the processor 174, the processor 174 may be configured to prompt the user to enter information regarding one or more user-related conditions. For example, the processor 174 may be programmed to display one or screens via the display of the user interface 180 that are configured to prompt a user to enter other data, such as data regarding his/her activity level and/or attire. The processor 174 may collect the data regarding the user's activity level and/or the user's attire provided by the user via the user interface 80, and may associate this data with the identified condition or change in condition, as well as the user's comfort level indicated for the identified condition or change in condition. This data may be collected and stored in a database contained in the memory 172 of the HVAC controller 18 or at an external server 66, as described herein, and in some cases used to build or develop a user's comfort profile.

In some cases, the processor 174 may be programmed to repeat the process of identifying an environmental condition or change in environmental condition, collecting data from the user regarding their comfort level and/or what user-related conditions may affect their comfort level under the identified environmental condition(s), and storing the collected data in a database one or more times. This data may be used to build or develop a user's comfort profile which may identify one or more conditions under which the user is expected to be comfortable. The more data collected from a user under a variety of conditions, the more accurate a user's comfort profile may be.

The processor 174 may be further programmed to identify one or more conditions or range of conditions under which the user is expected to be comfortable, based at least in part on the information collected from the user via the user interface 180 and/or in accordance with a user's comfort profile. These identified conditions or range of conditions may change over time and over indoor and/or outdoor conditions. For a given identified condition, the processor 174 may learn the indoor conditions that will make the user "comfortable" based on the user's feedback. In some cases, as discussed herein, the processor 174 may send control signals to the HVAC system 4 to drive the indoor conditions towards those that will make the user "comfortable". In other cases, wherein the user may be in an unfamiliar environment, the processor 64 may make recommendations to the user via the user interface 180 based on at least in part on the information collected from the user via the user interface 180 and/or in accordance with a user's comfort profile. For example, the processor 174 may prompt the user to change an operating parameter set point, open or close one or more windows, and/or change their attire via the user interface 180 such that if the user chooses to follow the recommendation issued by the processor 174, the user may be able to achieve and/or maintain a desired comfort level under the current identified conditions. The current identified conditions may include indoor and/or outdoor conditions.

FIGS. 5-9 provide several illustrative information collection screens 102, 120, 132a, 132b, 150a, and 150b that, depending upon the application, may be displayed to a user via the display of the user interface 68 of an HVAC controller 18 and/or the user interface 180 of a user's portable device, and that may be configured to solicit and/or collect input from a user regarding a user's current comfort level associated with one or more identified conditions. It will be generally understood that the same or similar screens may be displayed to a user via the user interface 180 of the user's portable remote device 162. Additionally, it will be generally understood that the same or similar screens may be displayed to each individual user within a group of users, if desired.

As discussed herein, the user interface 68 may be located at the HVAC controller 18, or at a remote device 62 that may be in communication with the HVAC controller 18 (e.g. smart phone, tablet computer, laptop computer, personal computer or any other suitable remote device as desired). In some cases, the processor 64 may be configured to display one or more screens to the user via the user interface 68 that may include a user prompt or a user interview question designed to solicit an input from a user related to the user's current comfort level under the present conditions. Information related to a user's comfort level may be collected from the user for each of a plurality of conditions identified by the processor 64. For example, if the processor 64 is monitoring indoor temperature, indoor humidity, and outdoor temperature, then the processor 64 may be configured to collect input from a user regarding the user's comfort for two or more combinations of indoor temperature, indoor humidity, and outdoor temperature. In addition to the user prompt or user interview question configured to solicit such data from a user, the one or more information collections screens 102, 120, 132a, 132b, 150a, and 150b may include information such as the current indoor temperature, indoor humidity, outdoor temperature, outdoor humidity, an operating parameter set point, weather related data, and/or other information that may be relevant to a user's perceived comfort level.

In some cases, the one or more information collection screens 102, 120, 132a, 132b, 150a, and 150b may be displayed to the user via the user interface 68 upon detection by the processor 64 that the user or at least one of a group of users is currently within the building or structure. In some cases, for example, the HVAC controller 18 may include a proximity sensor or motion sensor that may be configured to sense a user's movements near the HVAC controller 18. In another cases, an occupancy sensor may be used. Upon detecting that a user is currently within the building or structure, the processor 64 may be configured to display the one or more information collection screens 102, 120, 132a, 132b, 150a, and 150b via the user interface 68 located at the HVAC controller 18. The one or more screens 102, 120, 132a, 132b, 150a, and 150b may be accompanied by an alert such as flashing text, a change in color of the displayed text, and/or an audible sound that may alert the user to the display of one or more screens 102, 120, 132a, 132b, 150a, and 150b. In some cases, the processor 64 may be configured to display the one or more screens 102, 120, 132a, 132b, 150a, and 150b, and to alert a user to their display in response to a set point change initiated by the user or in accordance with a predetermined operating schedule and/or a change in an environmental condition within or outside of the building that may potentially impact a user's perceived comfort.

In cases where the user interface 68 is provided at a remote device 62, the processor 64 may be configured to detect a location of the user's remote device 62 relative to the HVAC controller 18 and/or building associated with the user or group of users. This may be accomplished in a number of ways. In one example, the processor 64 may be configured to detect when the user's remote device 62 joins a local area network (e.g. WLAN) to which the processor 64 is also connected. In another example, the processor 64 may be configured to receive data from the user's remote device 62 that may be indicative of its location relative to the HVAC controller 18 (e.g. GPS data). The user's remote device 62 may be configured to transmit such data indicative of its position to the HVAC controller 18 either directly or via an external web server such as, for example, web server 66. The processor 64 may be configured to display the one or more information collection screens 102, 120, 132a, 132b, 150a, and 150b via the user interface 68 provided at the remote device 62 in response to the processor 64 determining that the user's remote device 62 has crossed some predetermined threshold boundary relative to the location of either the HVAC controller 18 and/or the building associated with the user. These are just some examples.

Figure 5:
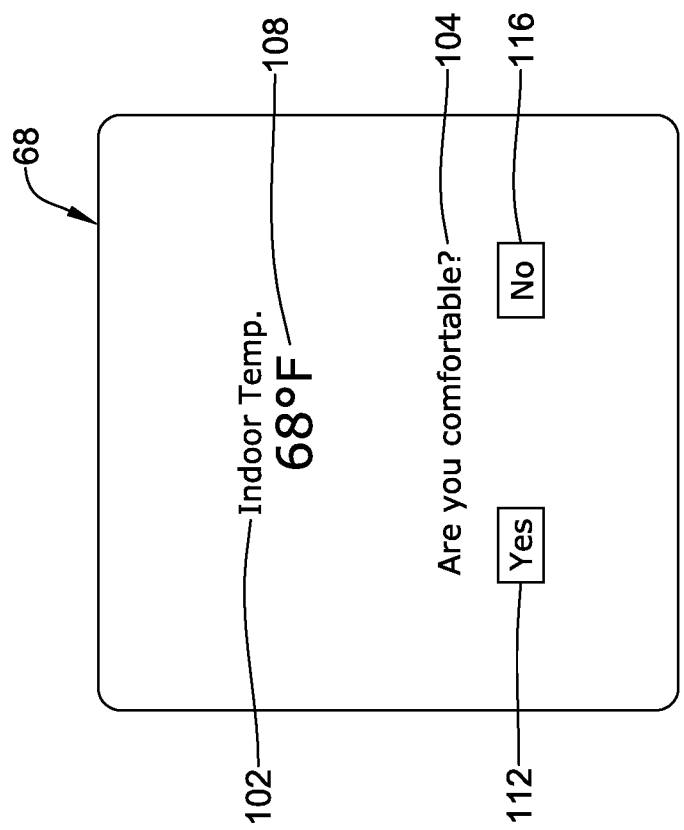
FIGS. 5-9 show several illustrative screens that may be displayed to a user via a user interface of an HVAC controller.

FIG. 5 shows an illustrative information collection screen 102 that may include a user prompt 104 that prompts a user to provide information about his/her perceived comfort. In some cases, the user prompt 104 may be presented as an interview question (e.g. "Are you comfortable?"). In other cases, the user prompt 104 may be presented as a command, instructing the user to take some sort of action, or as "fill in the blank" statement. Additionally, the screen 102 may display an indoor temperature, an indoor humidity, an outdoor temperature, an outdoor humidity, an operating parameter set point, weather related data, and/or other information that may be relevant to a user's perceived comfort level. In the example shown in FIG. 5, the screen 102 displays a user prompt 104, which poses the question "Are you comfortable?" In addition, the screen 102 displays a current indoor temperature value 108. Information collection screen 102 may also include one or more selectable options 112, 116 for responding to the user prompt 104. As shown in FIG. 5, screen 102 includes a first selectable option 112 corresponding to a positive response or "Yes", and a second selectable option 116 corresponding to a negative response or "No".

Figure 6:
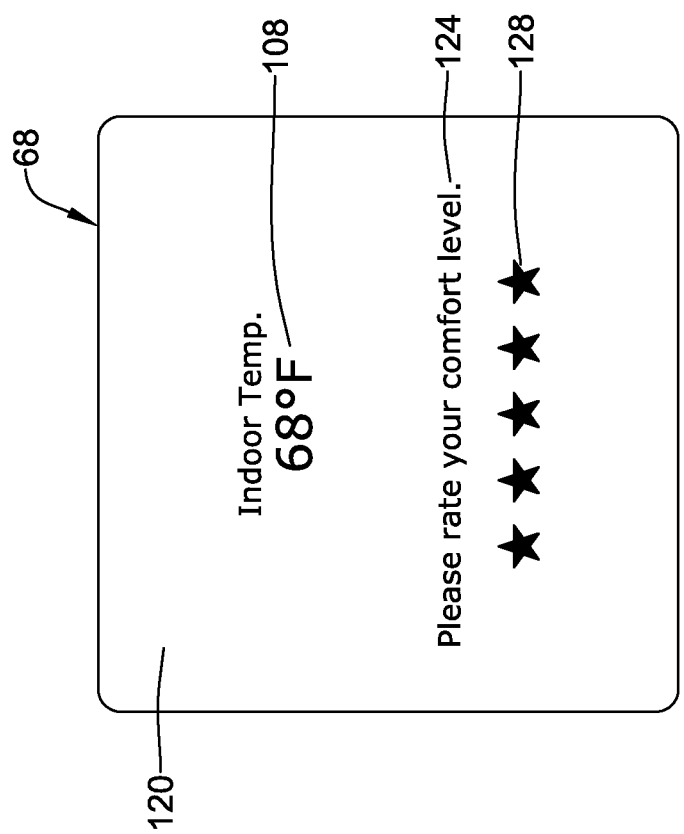

FIG. 6 shows another example of an illustrative collection screen 120 that may include a user prompt 124 that prompts a user to rate his/her perceived comfort level along a rating scale. In the example shown in FIG. 6, the user prompt 124 is presented as an instruction or command rather than a question. A user rating scale 128 is a provided from which the user may select a rating that is indicative of their perceived comfort level under the current conditions. In some cases, the rating scale may be a five-star rating scale, as shown, which may permit a user to rate their comfort level from one-star to five-stars, with one-star corresponding to the lowest comfort level or even discomfort and five-stars corresponding to a user's ideal comfort level. Similarly, a number rating scale may also be provided which may allow user to rate their comfort level on scale from one to five with one being the lowest possible rating and five being the highest possible rating. It is contemplated that other rating scales may be used, as desired.

The processor 64 may be configured to display one or more other information collection screens 132a, 132b, 142a, 142b as desired. Information collection screens 132a, 132b, 142a, 142b are configured to collect additional information about what user-related factors might be affecting the user's perceived comfort level under certain conditions. For example, as shown in the examples of FIGS. 7A and 7B, the processor 64 may be configured to display a screen 132a, 132b that may include a user prompt 136a, 136b that may prompt a user to provide information regarding their activity level.

Figure 7A:
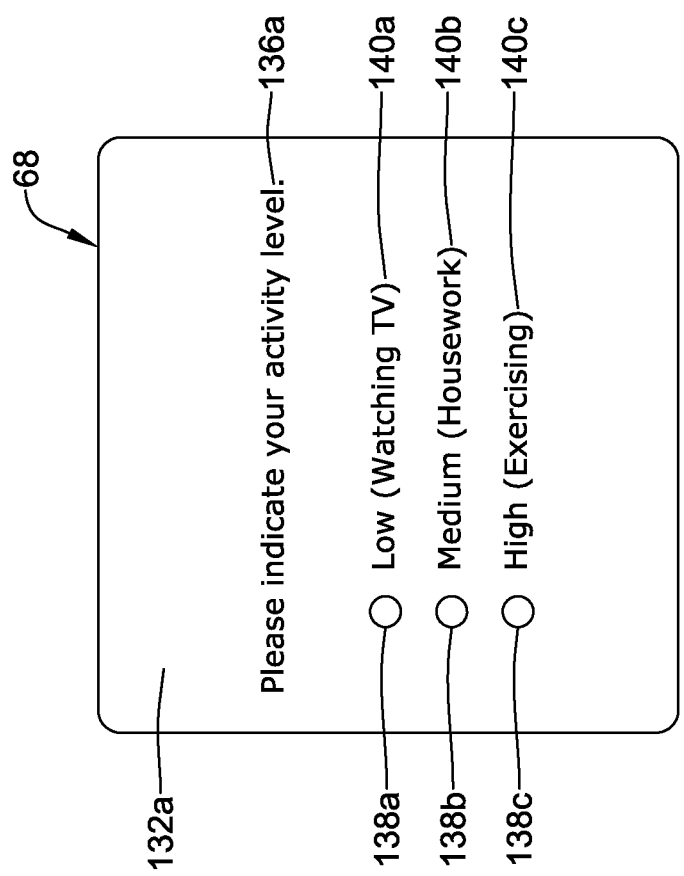

As shown in FIG. 7A, the user prompt 136a may prompt the user to indicate their activity level by selecting one of three selectable options 138a, 138b, 138c, each corresponding to different activity level (e.g. low, medium and high). Each of selectable options 138a, 138b, and 138c may be accompanied by a brief descriptor that provides additional information about each option. For example, selectable option 138a may correspond to a low activity level, and may include the descriptor "watching TV." Similarly, selectable option 138b may include the descriptor "housework", and selectable option 138c may include the descriptor "exercising." These descriptors, when provided, may aid the user in selecting the most appropriate option that best indicates their current activity level. The selectable options 138a, 138b 138c may be highlighted upon selection by a user to indicate their selection.

Figure 7B:
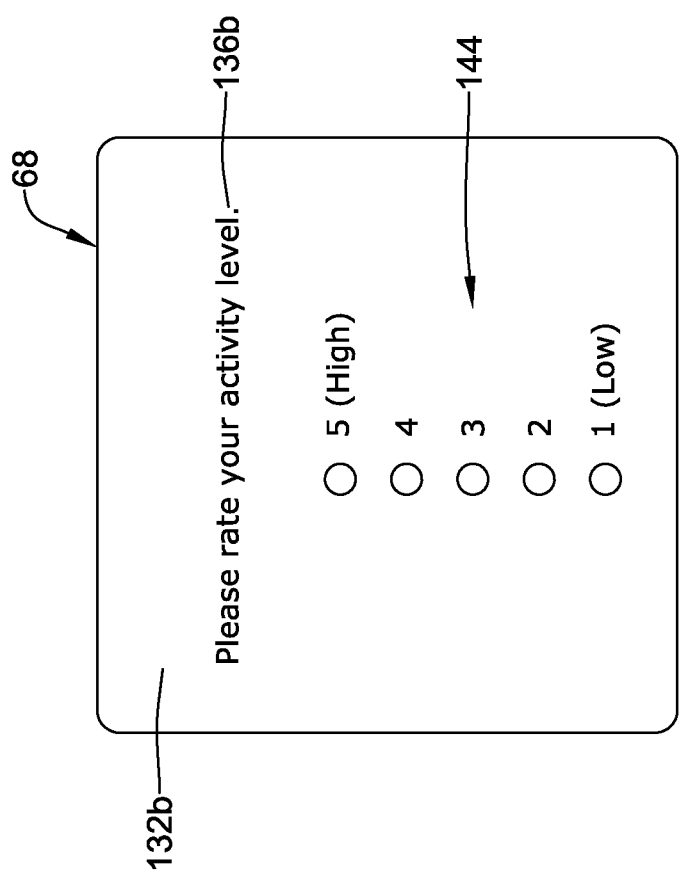

FIG. 7B provides another example of a screen 132b that may be provided by the processor 64 to collect additional information from a user regarding the user's activity level. In this example, the user prompt 136b may prompt the user to rate their activity level using a rating scale. A user rating scale 144 is provided from which the user may select a rating that is indicative of their current activity level. In some cases, the rating scale 144 may be a number rating scale which may allow the user to rate his/her activity level on a scale from one to five. A descriptor (e.g. high and/or low) may be provided adjacent the upper and lower limits of the scale to facilitate selection of an appropriate activity level by a user. In other cases, the rating scale may be a star rating scale, which may permit a user to rate their activity level on a five-star scale. Other rating scales may be used as desired.

Figure 8A:
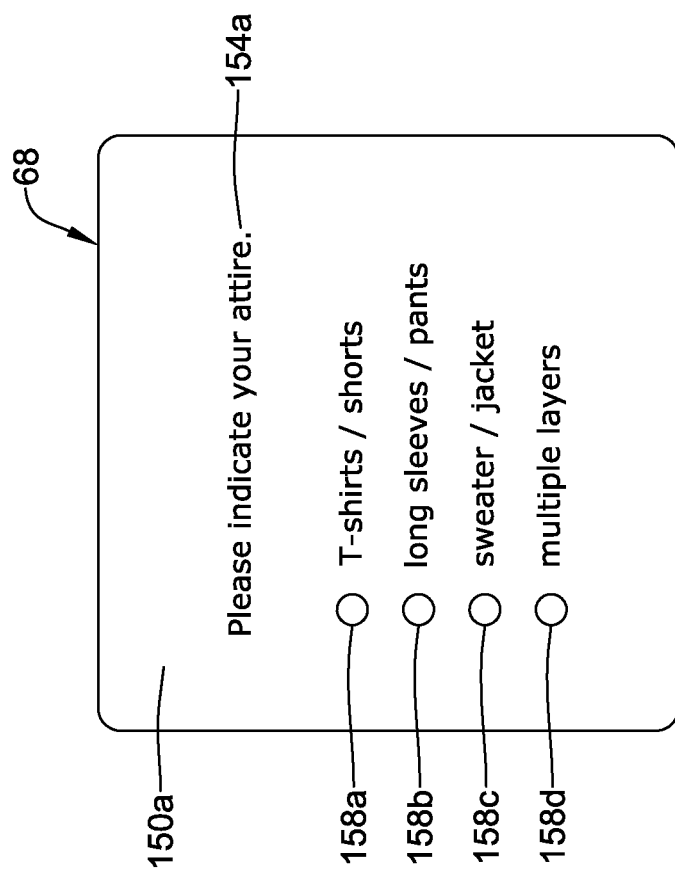

FIGS. 8A and 8B show other information collection screens 150a, 150b that may be displayed to a user via the user interface 68, and which are configured to collect information related to a user's attire. As shown in FIG. 8A, information collection screen 150a may include a user prompt 154a that prompts a user to indicate their current attire. One or more selectable options 158a-158d, each corresponding to a different manner of attire, may be provided for selection by a user. The selectable options 158a-158d may be highlighted in some fashion upon selection by a user to indicate their selection. In the example shown in FIG. 8B, information collection screen 150b may include a user prompt 154b that instructs the user to complete a statement of "fill in the blank" by selecting one of the selectable options 162a-162d provided on the screen. Each of the selectable options 162a-162d may correspond to a different level or type of attire. The selectable options 162a-162d may be highlighted in some fashion upon selection by a user to indicate their selection.

Figure 9:
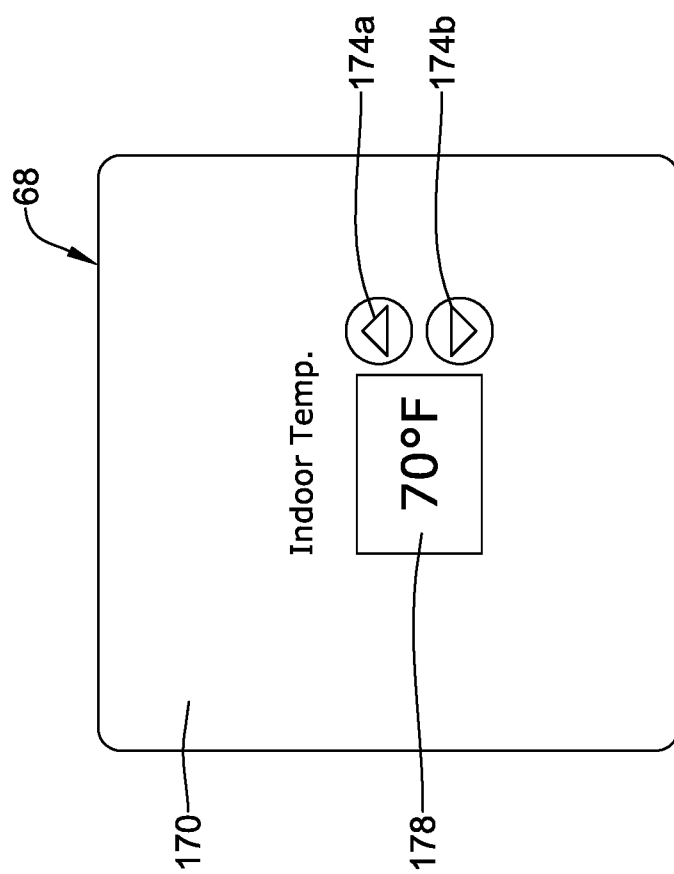

Referring back to FIGS. 5 and 6, upon receiving a negative response to the question "Are you comfortable?" presented by screen 102 (FIG. 5) or a less than favorable rating from a user through screen 120 (FIG. 6), the processor 64 may be programmed to display at least one additional screen that may permit a user to change an operating parameter set point such as, for example, a temperature set point such as shown in the example provided by FIG. 9. As shown in FIG. 9, screen 170 may include a first arrow 174a and a second arrow 174b for increasing or decreasing a temperature set point 178, respectively. In some cases, the processor 64 may be configured to provide additional screens for changing additional operating parameter set points such as for example, an indoor humidity set point. The screen 170 through which a user may initiate a set point change may be provided in additional to information collection screens 102, 120, 132a, 132b, 150a, and 150b, if desired.

The information collection screens 102, 120, 132a, 132b, 150a, and 150b may be configured to collect information from a user such that the processor 64 may learn under which conditions a user may be "comfortable", and/or under which conditions a user may be "uncomfortable", and in some instances, additional user-related conditions that may affect the user's comfort level (e.g. activity level, attire). The user's answers to the various prompts presented by the information collection screen may be associated with the corresponding environmental conditions. Such data may then be stored in a database or the like contained in the memory 72 of the HVAC controller 18 or, in some cases, may be stored in a database hosted by an external server that may be accessible via the network 58. The processor 64 may be programmed to use the collected data to learn the user's preferences for comfort under various conditions. Then, when those same conditions are detected again, the processor 64 may drive the environmental conditions inside of the building toward those conditions that are expected to be perceived by the user(s) as "comfortable". In some cases, after sufficient data has been collected from the user, the processor 64 may present the information collection screens 102, 120, 132a, 132b, 150a, and 150b less frequently to the user.

In many cases, the processor 64 may be programmed to control the one or more HVAC components of the HVAC system 4 to maintain the one or more conditions or range of conditions at a level that maintains a user's or group of user's expected comfort level within a building based, at least in part, on the information collected from the user via the one or more information collection screens 102, 120, 132a, 132b, 150a, and 150b. The processor 64 may be programmed to control the HVAC system 4 such control, one or more control signals to activate and/or deactivate one or more components of the HVAC system 4 via the control terminals 78 such that one or more environmental conditions are driven toward the one or more conditions under which the user is expected to be comfortable. For example, the processor 64 may send one or more controls signals via the control terminals 78 to activate and/or deactivate one or more components of the HVAC system 4 to maintain an indoor temperature at a temperature value at which the user is expected to be comfortable. The temperature value (e.g. temperature set point) may be automatically changed by the HVAC controller 18 over time as the conditions change (e.g. with a changing outdoor temperature). Similarly, the processor 64 may send one or more controls signals via the control terminals 78 to activate and/or deactivate one or more components of the HVAC system 4 to maintain an indoor humidity at a humidity level at which the user is expected to be comfortable.

An illustrative method for operating a thermal comfort control system for servicing a building may include: identifying one or more environmental conditions of a building; prompting a user to input whether the user is comfortable; receiving an input that indicates whether the user is comfortable; storing one or more of the identified conditions present at the time the user is prompted to enter whether the user is comfortable; repeating the identifying, prompting, receiving and storing steps one or more times; and identifying one or more of the identified conditions under which the user indicates as being comfortable. In some instances, the identifying, prompting, receiving and storing steps are repeated in response to a predetermined detected change in one or more of the identified conditions.

In some cases, a computer readable medium may have stored thereon in a non-transitory state a program code, wherein the program code is configured to cause a computing system to execute a method comprising: identifying one or more conditions of a building; prompting a user to input a user's comfort, and in response, receiving a corresponding input from the user; repeat identifying one or more conditions of a building, prompting a user to input a user's comfort, and in response, receiving a corresponding input from the user; learning under what conditions the user is expected to be comfortable, resulting in one or more comfort conditions; and providing one or more commands to control an HVAC system, wherein the one or more commands are configured to cause the HVAC system to achieve the one or more comfort conditions inside of a building. The computing system may include a thermostat, a portable remote device, a web server, or any other suitable computing device.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method of maintaining and/or increasing a user's perceived comfort within a building that is serviced by an HVAC system, the method comprising:
   detecting a variety of different environmental conditions, wherein the variety of different environmental conditions include different combinations of indoor temperature, outdoor temperature, indoor humidity, outdoor humidity, solar index, smog level, wind speed, wind direction, and pollen count;
   prompting the user to input a perceived comfort level for each of the variety of different environmental conditions;
   generating perceived comfort levels for the variety of different environmental conditions based on receiving one or more user inputs that are responsive to the prompting;
   populating a memory with each respective perceived comfort level of the perceived comfort levels along with an environmental condition of the variety of different environmental conditions that corresponds to the respective perceived comfort level;
   learning under what environmental conditions inside the building the user is expected to be comfortable based at least in part on the perceived comfort levels along with the environmental condition of the variety of different environmental conditions that corresponds to the respective perceived comfort level populated in the memory; and
   providing one or more commands to the HVAC system that cause the HVAC system to achieve an environmental condition inside the building under which the user is expected to be comfortable.

2. The method of claim 1, wherein the memory stores a database, wherein the database is populated with each of the perceived comfort levels along with the environmental condition of the variety of different environmental conditions that corresponds to the respective perceived comfort level.

3. The method of claim 1, wherein the learning comprises learning a range of environmental conditions inside the building under which the user is expected to be comfortable based at least in part on the perceived comfort levels along with the environmental condition of the variety of different environmental conditions that corresponds to the respective perceived comfort level in the memory.

4. The method of claim 1, wherein the prompting comprises, prompting via a user interface of an HVAC controller.

5. The method of claim 1, wherein the prompting comprises prompting via a user interface of a portable remote device.

6. The method of claim 5, wherein the portable remote device is one of a mobile phone, a personal digital assistant, or a tablet computer.

7. The method of claim 1, wherein each of the perceived comfort levels indicates whether the user is either comfortable or not comfortable.

8. The method of claim 1, wherein each of the perceived comfort levels indicates a rating along a rating scale of four or more perceived comfort levels.

9. The method of claim 1, further comprising displaying one or more recommendations for achieving the environmental condition inside the building under which the user is expected to be comfortable.

10. The method of claim 1, wherein the detecting comprises detecting a change in one or more environmental conditions of the variety of different environmental conditions that might affect the user's perceived comfort level, wherein the prompting is in response to detecting the change.

11. A method of maintaining, with a processor, and/or increasing, with the processor, a user's perceived comfort within a building that is serviced by an HVAC system, the method comprising:
monitoring an indoor temperature, an indoor humidity, and an outdoor temperature;
detecting when each of a variety of different environmental conditions occurs, wherein the variety of different environmental conditions include different combinations of indoor temperature, outdoor temperature, indoor humidity, outdoor humidity, solar index, smog level, wind speed, wind direction, and pollen count;
in response to detecting a change in one of the variety of different environmental conditions that might affect the user's perceived comfort, prompting the user to input a perceived comfort level;
populating a database with each perceived comfort level along with a respective environmental condition of the variety of different environmental conditions that corresponds to the respective perceived comfort level;
developing a user's comfort profile based, at least in part, on the database; and
based at least in part on the user's comfort profile, providing one or more commands to the HVAC system that cause the HVAC system to achieve an environmental condition inside the building under which the user is expected to be comfortable.

12. The method of claim 11, further comprising reducing occurrences at which the user is prompted to input the perceived comfort level over time.

13. A portable remote device comprising:
an input/output port configured to send and/or receive data over a network;
a user interface including a display;
a controller coupled to the input/output port and the user interface, the controller configured to:
identify when each of a variety of different environmental conditions are occurring, wherein the variety of different environmental conditions include different combinations of indoor temperature, outdoor temperature, indoor humidity, outdoor humidity, solar index, smog level, wind speed, wind direction, and pollen count;
prompt a user via the user interface to input a perceived comfort level under each of the variety of different environmental conditions;
receive perceived comfort levels via the user interface; and
transmit each of the perceived comfort levels to a remote server over the network in order to populate a database that includes each respective perceived comfort level of the perceived comfort levels along with an environmental condition of the variety of different environmental conditions that corresponds to the respective perceived comfort level.

14. The portable remote device according to claim 13, wherein the portable remote device is a smart phone or a tablet computer.

15. The portable remote device according to claim 13, wherein the controller is further configured to provide one or more recommendations to the user via the display for achieving a user's comfort.

16. The portable remote device according to claim 13, wherein the controller is further configured to prompt the user via the user interface to input one or more user-related conditions, wherein the one or more user-related conditions include one or more of an activity level of the user or a type of clothing worn by the user.

* * * * *